US006283514B1

United States Patent
Letzel

(10) Patent No.: US 6,283,514 B1
(45) Date of Patent: Sep. 4, 2001

(54) APPARATUS FOR MONITORING AND CONTROLLING ACCESS TO A RESTRICTED AREA

(75) Inventor: Helmut Letzel, Cologne (DE)

(73) Assignee: K. A. Schmersal GmbH & Co., Wuppertal (DE)

(*) Notice: Subject to any disclaimer, the term of this patent is extended or adjusted under 35 U.S.C. 154(b) by 0 days.

(21) Appl. No.: 09/317,338

(22) Filed: May 24, 1999

Related U.S. Application Data

(63) Continuation-in-part of application No. 08/910,610, filed on Aug. 13, 1997, now abandoned.

(30) Foreign Application Priority Data

Aug. 16, 1996 (DE) .............................................. 196 32 962

(51) Int. Cl.[7] .................................................. E05C 1/06
(52) U.S. Cl. .................................. 292/142; 292/DIG. 65; 200/43.01
(58) Field of Search ........................... 70/142, 277, 278.1, 70/DIG. 42; 292/39, 142, 160, 172, 181, 254, 348.16, DIG. 62, DIG. 65; 200/43.01, 43.03, 43.16

(56) References Cited

U.S. PATENT DOCUMENTS

| | | | |
|---|---|---|---|
| 1,071,567 | 8/1913 | Outwater | 292/142 |
| 1,215,286 | * 2/1917 | Kollmeyer | 292/172 |
| 1,262,435 | 4/1918 | Berg . | |
| 1,495,820 | 5/1924 | Tierney . | |
| 1,720,590 | 7/1929 | Evans | 292/142 |
| 2,160,611 | 5/1939 | Alexander . | |
| 3,638,461 | 2/1972 | Watson | 70/92 |
| 4,058,333 | * 11/1977 | Roe | 292/172 |
| 4,248,068 | 2/1981 | Esser et al. | 70/134 |
| 4,333,324 | 6/1982 | Dietrich et al. | 70/107 |
| 4,502,716 | 3/1985 | Yu | 292/142 |
| 4,563,886 | 1/1986 | Kletzmaier et al. | 70/118 |
| 4,685,709 | * 8/1987 | Kambic | 292/201 |
| 4,695,684 | * 9/1987 | Bochard | 292/43.07 |
| 5,464,954 | * 11/1995 | Kimura | 200/61.62 |
| 5,488,207 | * 1/1996 | Niwa | 200/43.04 |
| 5,496,082 | 3/1996 | Zuckerman | 292/336.2 |
| 5,584,378 | * 12/1996 | Wecke | 200/43.04 |
| 5,609,244 | * 3/1997 | Reiter | 200/43.11 |
| 5,675,228 | * 10/1997 | O'Bryan | 318/453 |
| 6,013,881 | * 1/2000 | Hall | 200/43.04 |

FOREIGN PATENT DOCUMENTS

| | | | |
|---|---|---|---|
| 36 06 458 | 9/1987 | (DE) | 3/8 |
| 0367026 | 5/1990 | (EP) | 3/8 |
| 0 438 008 | 7/1991 | (EP) . | |
| 0577360 | 1/1994 | (EP) | 3/10 |
| 0 677 830 | 10/1995 | (EP) | 25/6 |
| 639 187 | 6/1928 | (FR) . | |
| WO 85/03970 | 9/1985 | (WO) | 17/22 |

OTHER PUBLICATIONS

Schmersal article entitled "Guard Locking Devices Series AZM 415", published 1994.

* cited by examiner

*Primary Examiner*—B. Dayoan
*Assistant Examiner*—Gary Estremsky
(74) *Attorney, Agent, or Firm*—Alix, Yale & Ristas, LLP

(57) ABSTRACT

The invention relates to a monitoring means for an area, which can be closed off by at least one door, of a mechanical installation, comprising a safety switch which is adjacent to the respective door and can be actuated by means of an elongate, key-like actuator. It is possible for the actuator to be brought into and out of engagement with the safety switch via two actuating handles which are respectively located on the outside and inside of the door and are coupled to one another by a pin. A control means is coupled to the mechanical installation and to the at least one safety switch for releasing and blocking the at least one safety switch. In this arrangement, the actuator, which can be displaced longitudinally in a guide of a covering by actuation of one of the actuating handles, has a rack section which is in engagement with a toothed-ring segment which is coupled to the pin.

14 Claims, 3 Drawing Sheets ns and disadvantages of the prior art and, in so doing, provides a novel and improved method for locking an access door and monitoring the state of the door. The invention also encompasses apparatus which cooperates with a safety switch for implementing such method and, particularly, a door mounted actuator which is longitudinally displaceable in response to door handle rotation, the actuator including a rack section which engages a ring gear segment coupled to a rotatable pin which extends through the door.

APPARATUS FOR MONITORING AND CONTROLLING ACCESS TO A RESTRICTED AREA

CROSS-REFERENCE TO RELATED APPLICATION

This application is Continuation-in-Part of application Ser. No. 08/910,610, filed Aug. 13, 1997 and now abandoned.

BACKGROUND OF THE INVENTION

1. Field of the Invention

The present invention relates generally to enhancing the safety and security of manufacturing processes and, particularly, to simultaneously monitoring and exercising control over access to enclosed areas which house operating machinery or the like. More specifically, the present invention is directed to mechanisms which may prevent the opening of and/or monitor the state of access doors and, especially, to mechanisms of such type which are suitable for mounting on access doors so as to be operable by handles provided on such doors. Accordingly, the general objects of the present invention are to provide novel and improved methods and apparatus of such character.

2. Description of the Prior Art

While not limited thereto in its utility, the present invention is particularly well suited for use in manufacturing facilities having enclosed areas in which, due to safety considerations, unattended operations are performed. Such an area may, for example, house machinery or machine elements which should not be approached by plant personnel while in operation. The doors or openings through which access to such areas is obtained are customarily provided with guard locking devices which include a door status signal generator, i.e., an electrical switch, located on an interior wall of the secure area adjacent to the access door. These previous guard locking devices, which are also generally known in the art as "safety switches", perform both of the functions of door locking and controlling the state of the status signal generator. The prior art "safety switches" have conventionally included pivotal actuators coupled to rotatable door handles. Pivotal actuators have the disadvantage that they are not suitable for use on sliding doors. Pivotal actuators also have the disadvantage that the force transmitted thereby during door handle operation is not uniform, i.e., latching of the door occurs with increasing clamping force on the fixed part of the door-locking mechanism and this non-uniform force will not reliably result in establishment of operational contact with the associated status signal generator. There has, accordingly, been a long-standing desire and need in the art for a universal monitoring/locking mechanism suitable for controlling and monitoring the state of both pivotally mounted and sliding access doors while being characterized by uniform force transmission.

SUMMARY OF THE INVENTION

The present invention overcomes the above-briefly discussed and other deficiencies In accordance with a preferred embodiment, the longitudinally displaceable actuator is supported in a guide mounted on the inside surface of an access door. The cooperating ring gear segment is also mounted on the door inside surface. This arrangement results in the actuator being pushed out of its retracted position, in response to manual operation of an exterior door handle coupled to the rotatable pin, with uniform force transmission. Such uniform force transmission reliably locks the door, i.e., positions the actuator for engagement by an interior wall mounted latching mechanism of a safety switch, and reliably operates an electrical switch or the like which causes a signal, which may be monitored, to change as a function of the state of the access door.

Apparatus in accordance with the invention is suitable for use on both pivoting and sliding doors and is readily adaptable for installation on doors of different thickness.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the several Figures and in which.

DETAILED DESCRIPTION OF THE DISCLOSED EMBODIMENT

Figure 9:
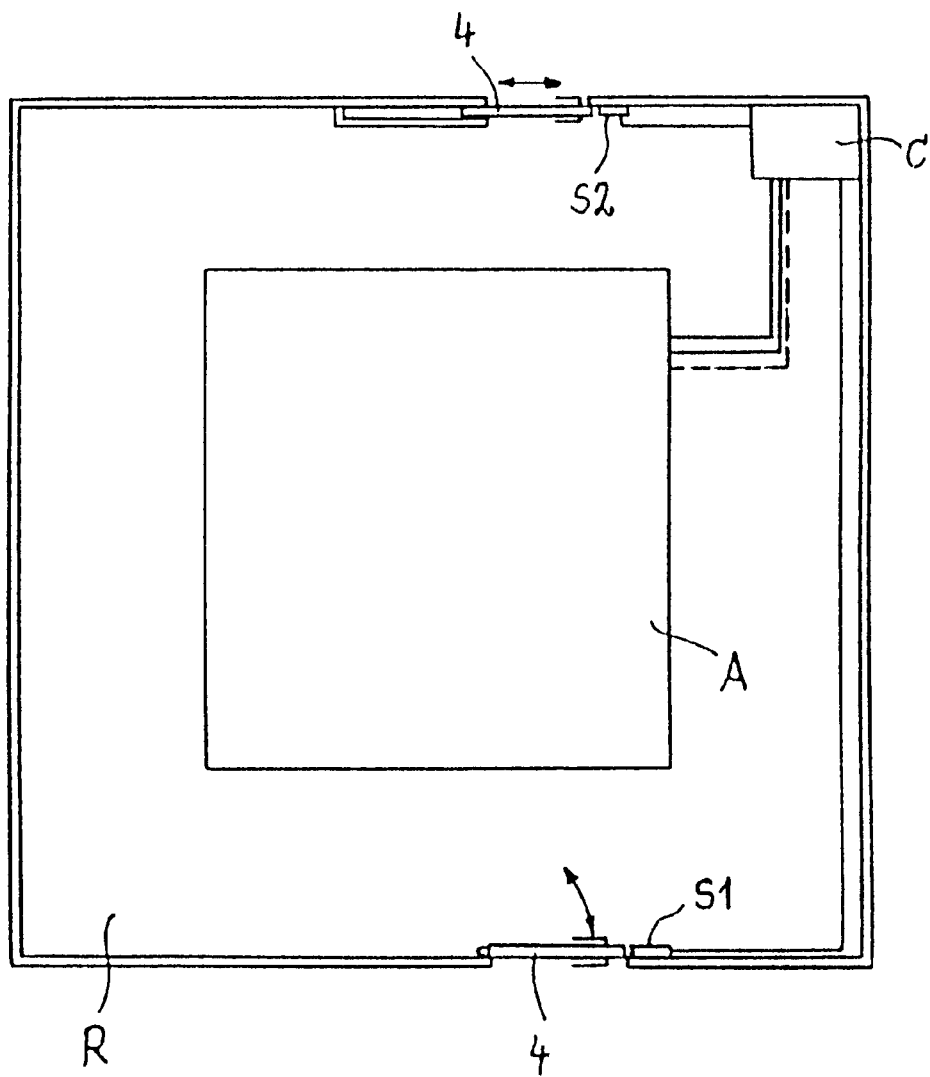
FIG. 9 is a top plan view which schematically illustrates a typical installation of access door monitoring means in accordance with the invention.

Referring first to FIG. 9, an enclosed area to which access must be limited is indicated at R. The area or room R may include a mechanism A, which when operating, will be unattended for safety reasons. By way of example, mechanism A may be a robotic production installation for forming or assembling. Access to room R is provided, in the example shown, by closure members in the form of a pair of doors 4. For purposes of illustration, a first of doors 4 is depicted as pivotally mounted while the other of doors 4 has been shown as a sliding access control member. "Safety switches", respectively indicated at S1 and S2, are mounted on interior walls of room R adjacent to respective of the doors 4. The safety switches S1,S2 are devices of a type which are known in the art. The safety switches, nevertheless, will be briefly described below.

A controller C is also located in room R although it could be positioned outside of room R. Controller C receives electrical signals from the mechanism A indicative of the operational state thereof. Controller C also receives status signals, i.e., signals commensurate with the closed and locked state or the open and unlocked state of the doors 4, from the switches S1 and S2. Controller signals for mechanism A and for causing the operation of latching mechanisms which are included in the safety switches S1,S2 will be generated by controller C. Thus, by way of example, when the signals provided to controller C from the mechanical installation A are indicative that the moving parts of the machinery located within room R are at a standstill, the controller will cause the release of the latching mechanism of safety switches S1,S2 with the result that the room R can be entered by opening the doors 4. However, if parts of the machinery comprising installation A which could be a safety hazard are not at a standstill, signals from controller C will cause the latching mechanism of safety switches S1,S2 to be in a blocking state with the result that the doors 4 cannot be opened from the outside.

Figure 1:
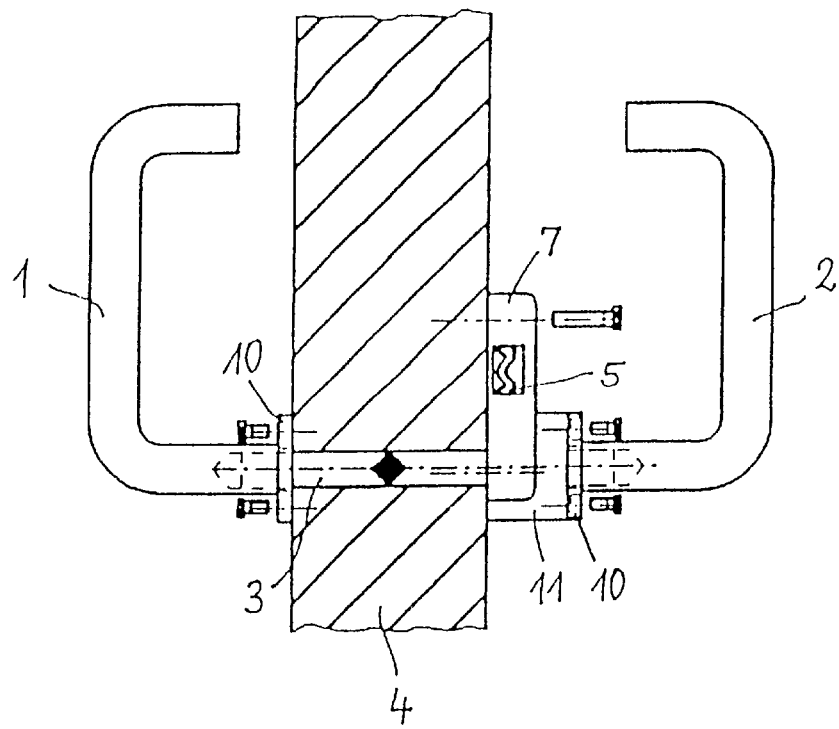
FIG. 1 is a partially exploded, front elevational view of a combined switch actuating and door locking mechanism in accordance with a first embodiment of the monitoring means of the present invention, the apparatus being schematically illustrated as installed on a door which is shown in cross-section.
Figure 2:
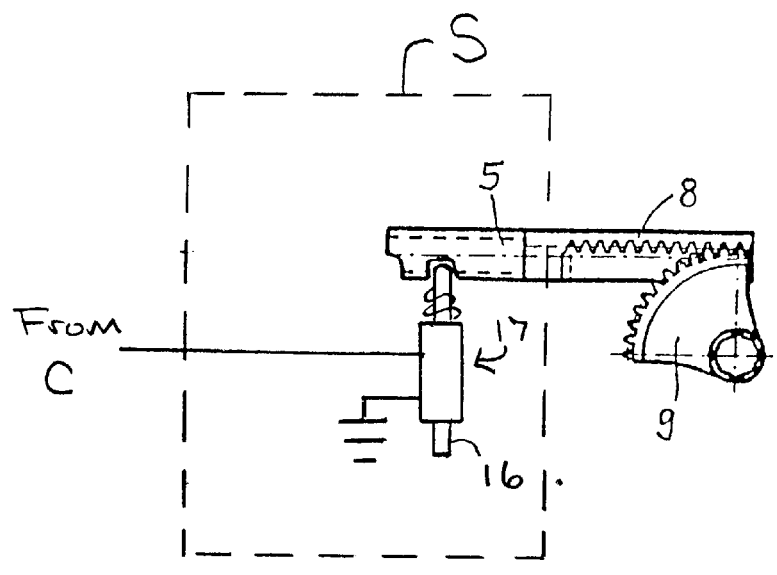
FIG. 2 is a side elevation view of the actuating member and associated gear segment of the monitoring means of FIG. 1, FIG. 2 also schematically showing the cooperation elements of the associated safety switch.

The latching mechanisms of safety switches S1 and S2, as schematically shown in FIG. 2, may, for example, be solenoid operated. Such a latch mechanism will selectively engage and mechanically capture the actuator of the monitoring means to lock the associated door 4 in the closed position, i.e., the latch mechanism will be movable between a first position, where it engages and thus prevents longitudinal movement of the actuator of the monitoring means, and a second position, where it releases the actuator for movement in response to door handle operation. At least in the case of a safety switch associated with a pivotal door, such as safety switch S1 of FIG. 9, a member which, in its simplest form, defines a guide having an aperture through which the actuator of the monitoring means passes when in the extended condition will be provided.

With reference now to FIGS. 1–8, a monitoring means in accordance with the present invention comprises, for mounting on each of the doors 4 of the FIG. 9 installation, a switch-actuating/door-locking apparatus which includes an exterior door handle 1 and an interior door handle 2. The door handles 1 and 2 are, in the manner to be described below, coupled to one another. The coupling mechanism includes an axle or pin 3 which extends through the door 4 and is affixed to or integral with exterior handle 1 for rotation therewith. It will be understood that, in the conventional manner, the pin 3 may extend through a tube mounted in a bore provided in door 4.

The monitoring means further includes, mounted on the interior of door 4, an elongated actuator 5. As may best be seen from FIGS. 2 and 4, actuator 5 is similar to a key blade, i.e., the actuator has a profile and is "bitted", i.e., is notched, for cooperation with a safety switch. Actuator 5 is supported, for longitudinal motion, in a guide 6 which is integral with a casing or cover 7. The cover 7 will be fastened to the interior surface of door 4. The actuator 5 includes an integral rack 8. Rack 8 engages a toothed-ring segment 9, i.e., a sector pinion, which extends over an angle of approximately 90°. The ring gear segment 9 is coupled to pin 3 for rotation therewith. Accordingly, rotation of pin 3 will result in longitudinal displacement of actuator 5 and thereby cause the actuator to selectively move between the retracted position depicted in FIG. 3 and the extended position depicted in FIG. 4. The extended position of the actuator 5 is, in the embodiment being described, commensurate with the locked state of door 4 wherein the actuator is engaged, for example, by a complementary solenoid operated latch mechanism of a safety switch S mounted in a fixed position adjacent to door 4. As shown schematically in FIG. 2, actuator 5 has a notch shaped for engagement by the end of a solenoid operated plunger 16 of latch mechanism 17 of safety switch S. As also shown schematically in FIG. 2, the extended position of actuator 5 establishes contact with the plunger 16 which also comprises part of the cooperating safety switch S.

Mechanical stops, not shown, are expediently provided in order to limit the motion of the handles 1, 2 to rotation through an angle of approximately 90°. Rosettes 10 will typically be provided about the shaft extensions of handle 1 and handle 2 where they respectively pass into the door and the casing 7. Conventional means will be provided to prevent motion of the handles 1 and 2 in the axial direction of pin 3 once the monitoring means has been installed.

Figure 6:
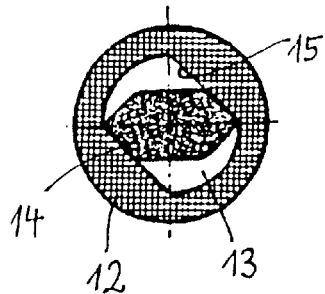
FIG. 6 is a partial cross-sectional view depicting the coupling between the interior door handle and the remaining components of the disclosed embodiment when such components are in relative positions depicted in FIG. 3.
Figure 7:
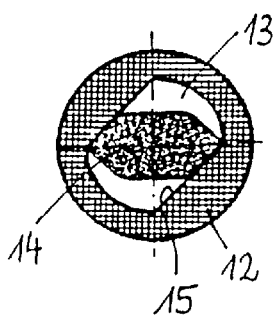
FIG. 7 is a partial cross-sectional view depicting the coupling between the interior door handle and the remaining components of the disclosed embodiment when such components are in relative positions depicted in FIG. 4.
Figure 8:
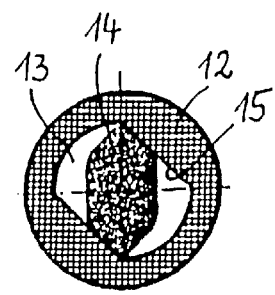
FIG. 8 is a partial cross-sectional view depicting the coupling between the interior door handle and the remaining components of the disclosed embodiment when such components are in relative positions depicted in FIG. 5.

Controller C will disable potentially dangerous elements of installation A in the absence of signals indicating that the doors 4 are closed and locked. In order to implement the safety requirement that a dangerous condition not be established while personnel are in the room R, and particularly to prevent personnel from closing and locking the doors from the inside, the present invention includes a mechanism which enables retraction but not extension of the actuator 5 through manipulation of the interior handle 2. This mechanism, in the disclosed embodiment, is a "free wheel" connection between handle 2 and pin 3. This connection is embodied in a disk 12 and cooperating shaped section 14 of the shaft-like extension of handle 2 as shown in FIGS. 6–8. The disk 12 is accommodated in a cylindrical extension 11 of cover 7 and has a central cutout 13. The cutout 13, as clearly shown in the drawings, has a pair of oppositely disposed, substantially parallel, flat sides 15 which are interconnected by arcuate ends. Disk 12 is affixed, in any suitable manner, to ring segment 9 and, via ring segment 9 and pin 3, is directly mechanically coupled to the exterior handle 1. The shaped shaft section 14, which extends from handle 2, is received in the cutout 13 and has the form of an elongated hexagon. The arcuate end portions of the cutout 13 define the diameter of a circle which corresponds in length to the largest longitudinal extent of the cross-section of shaft section 14. The opposite straight side walls 15 of cutout 13 are spaced by a distance which permits these wall surfaces to function as "carry along" surfaces, i.e., drive surfaces for the shaft section 14.

Figure 3:
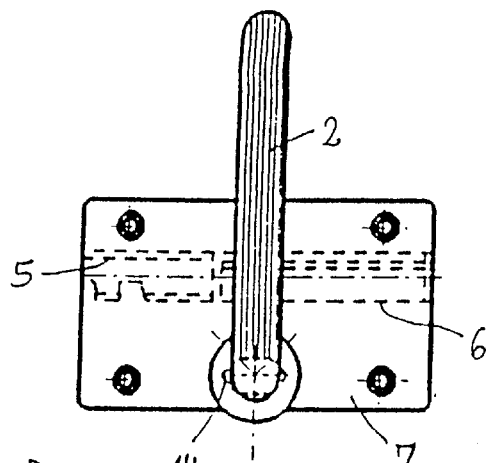
FIG. 3 is a side elevation view, with internal components illustrated schematically, of the apparatus of FIG. 1 with the actuator in the retracted position and the inside door handle in a first position.

When the monitoring means is in the state depicted in FIG. 3, where the actuator 5 is retracted into cover 7 and handle 2 is located in the vertical position, the disk 12 will be oriented as shown in FIG. 6 such that 90° of clockwise rotation of handle 2 is required to establish a driving connection between shaft section 14 and disk 12. Accordingly, as may be seen from FIG. 6, the shaft section 14 can freely rotate 90° in the clockwise direction relative to disc 12 before any driving contact is established between a drive surface on shaft section 14 and a surface 15 which defines the cutout 13. Thus, rotation of handle 2 in the clockwise direction will not extend the actuator 5 when the actuator has been moved to the retracted position by exterior handle 1.

Figure 4:
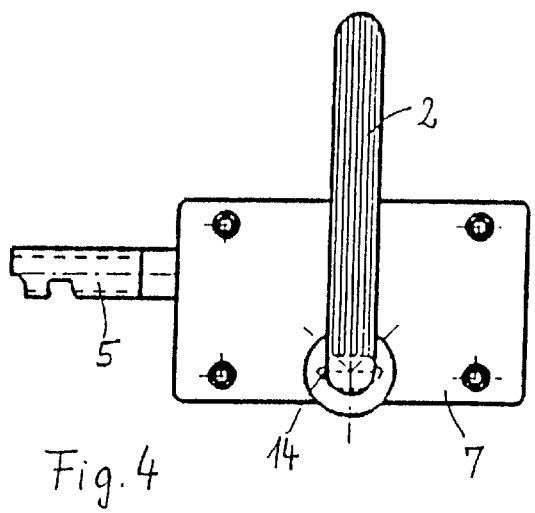
FIG. 4 is a side elevation view of the apparatus of FIG. 1 with the actuator in the extended position and the door handle in the first position.

FIG. 4 depicts the condition where the actuator 5 has been extended to the locked position through the use of the exterior handle 1 which is drivingly connected thereto via pin 3, ring segment 9 and rack 8. FIG. 7 shows the relative positions of disk 12 and shaft section 14 with the actuator extended and the interior handle in the vertical position. Obviously, the imparting of clockwise motion to handle 2 with the condition of FIGS. 4 and 7 established, i.e., movement to the position of FIGS. 5 and 8, will result in the shaft section 14, which is integral with handle 2, driving the disk 12. The resultant movement of disk 12, through the connection between disk 12 and ring segment 9, will drive rack 8 to cause retraction of actuator 5. Thus, the monitoring means of the present invention will preclude the accidental entrapment of personnel in room R.

Figure 5:
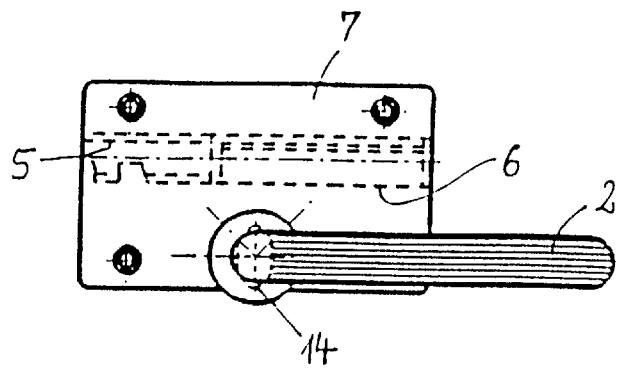
FIG. 5 is a view similar to FIG. 3 but with the door handle in a second position.

As should be obvious, and as may be seen from FIGS. 5 and 8, after handle 2 has been rotated 90° in the clockwise direction from the condition depicted in FIGS. 4 and 7, subsequent counterclockwise rotation of handle 2 will be under the freewheeling condition and will not result in the actuator 5 being extended.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. An apparatus for monitoring and controlling access through a closure member to a restricted area containing a device, the device being operable to perform a function creating a personnel safety hazard, the device emitting electrical signals indicative of the device's operating status, the apparatus comprising:

a safety-switch adapted to be immovably mounted in proximity to the closure member and having an electrically-driven and selectively-operable latching mechanism;

an actuator having a rack, the latching mechanism having a first state in which it can capture the actuator to thereby prevent movement thereof and a second state in which it disengages from the actuator;

a switch actuating/locking apparatus including a manual mechanism for longitudinally moving the actuator via a guide between a first position in which the actuator may be captured by the latching mechanism of the safety switch and a second position in which the actuator cannot be captured by the latching mechanism, the manual mechanism having rotatable interior and exterior handles;

an axle coupled to the exterior handle for rotation therewith, the axis of rotation of the axle being at least generally transverse to the motion path of the actuator, the axle extending through the closure member in the installed condition of the switch actuating/locking apparatus;

a gear coupled to the axle for rotation therewith, the gear engaging the actuator rack whereby rotation of the exterior handle will impart longitudinal motion to the actuator when the actuator is not captured by the latching mechanism; and coupling means for selectively coupling the interior handle to the gear whereby rotation of the interior handle will move the actuator, when the actuator is not captured by the latching mechanism, only from the first position to the second position; and a controller adapted to be responsive to the electrical signals of the device wherein the controller selectively drives the latching mechanism of the safety-switch between the first and second states to prevent access to the restricted area when the device is operating.

2. The apparatus of claim 1, wherein said switch actuating/locking apparatus further comprises a cover which is adapted to be mounted on the restricted side of the closure member and comprises the guide for directing movement of the actuator, and wherein said first longitudinal position of the actuator is an extended position relative to said cover.

3. The apparatus of claim 2, wherein the actuator, gear and cover are installed on the restricted side of the closure member.

4. The apparatus of claim 1, wherein said interior handle includes an integral drive shaft rotatable about an axis and wherein said coupling means permits relative rotation between said drive shaft and said axle.

5. The apparatus of claim 4, wherein said drive shaft has a section having a pair of opposite parallel surfaces and said coupling means has a cut-out portion having a pair of oppositely-disposed and substantially-parallel sides.

6. The apparatus of claim 5, wherein said drive shaft section has the form of an elongated hexagon and said cut-out portion of said coupling means has the form of a pair of arcuate end walls interconnecting said substantially parallel sides.

7. The apparatus of claim 1, wherein said coupling means comprises freewheel means for allowing said interior handle to move said actuator to said second position and preventing said interior handle from moving said actuator to said first position.

8. The apparatus of claim 7, wherein said interior handle includes a sectionally elongate drive shaft, and wherein said freewheel comprises a disc which is mechanically coupled to said exterior handle and which defines a cut-out for receiving said drive shaft, said cut-out being at least as wide as the elongate dimension of said drive shaft in one direction thereof and being smaller than the elongate dimension of said drive shaft in another direction thereof.

9. The apparatus of claim 8, wherein said shaft has a pair of opposite parallel surfaces and said cut-out has a pair of oppositely-disposed and substantially parallel sides.

10. The apparatus of claim 9, wherein said shaft has the form of an elongated hexagon and said cut-out has the form of a pair of arcuate end walls interconnecting said substantially parallel sides.

11. The apparatus of claim 1, wherein said manual mechanism does not comprise a key-actuated mechanism.

12. The apparatus of claim 1, wherein said gear is a toothed ring-segment.

13. An apparatus for monitoring and controlling access through a closure member to a restricted area, the apparatus comprising:

a device adapted to be disposed within the restricted area, the device being operable to perform a function creating a personnel safety hazard, the device emitting electrical signals indicative of the device's operating status, a safety-switch adapted to be immovably mounted in proximity to the closure member and having an electrically-driven and selectively-operable latching mechanism;

an actuator having a rack, the latching mechanism having a first state in which it can capture the actuator to thereby prevent movement thereof and a second state in which it disengages from the actuator;

a switch actuating/locking apparatus including a manual mechanism for longitudinally moving the actuator via a guide between a first position in which the actuator may be captured by the latching mechanism of the safety switch and a second position in which the actuator cannot be captured by the latching mechanism, the manual mechanism having rotatable interior and exterior handles;

an axle coupled to the exterior handle for rotation therewith, the axis of rotation of the axle being at least generally transverse to the motion path of the actuator, the axle extending through the closure member in the installed condition of the switch actuating/locking apparatus;

a gear coupled to the axle for rotation therewith, the gear engaging the actuator rack whereby rotation of the exterior handle will impart longitudinal motion to the actuator when the actuator is not captured by the latching mechanism; and coupling means for selectively coupling the interior handle to the gear whereby rotation of the interior handle will move the actuator, when the actuator is not captured by the latching mechanism only from the first position to the second position; and a controller responsive to the electrical signals of the device wherein the controller selectively drives the latching mechanism of the safety-switch between the first and second states to prevent access to the restricted area when the device is operating.

14. An apparatus for monitoring and controlling access through a closure member to a restricted area containing a device, the device emitting electrical signals indicative of the device's operating status, the apparatus comprising:

a safety-switch adapted to be immovably mounted in proximity to the closure member and having an electrically-driven and selectively-operable latching mechanism;

an actuator having a rack, the latching mechanism having a first state in which it can capture the actuator to thereby prevent movement thereof and a second state in which it disengages from the actuator;

a switch actuating/locking apparatus including a manual mechanism for longitudinally moving the actuator via a guide between a first position in which the actuator may be captured by the latching mechanism of the safety switch and a second position in which the actuator cannot be captured by the latching mechanism, the manual mechanism having at least one rotatable handle;

an axle coupled to the at least one handle for rotation therewith, the axis of rotation of the axle being at least generally transverse to the motion path of the actuator, the axle extending through the closure member in the installed condition of the switch actuating/locking apparatus; and a gear coupled to the axle for rotation therewith, the gear engaging the actuator rack whereby rotation of the at least one handle will impart longitudinal motion to the actuator when the actuator is not captured by the latching mechanism; and a controller adapted to be responsive to the electrical signals of the device and to the state of the latching mechanism, wherein the controller selectively drives the latching mechanism of the safety-switch between the first and second states to prevent access to the restricted area when the device is operating and wherein the controller disables the device when the latching mechanism is in the second state.

\* \* \* \* \*